United States Patent [19]

Thomsen et al.

[11] 4,364,302

[45] Dec. 21, 1982

[54] HYDRAULIC CONTROL APPARATUS FOR A SERVO-MOTOR, PARTICULARLY FOR VEHICLE STEERING

[75] Inventors: Svend E. Thomsen; Thorkild Christensen, both of Nordborg, Denmark

[73] Assignee: Danfoss A/S, Nordborg, Denmark

[21] Appl. No.: 178,146

[22] Filed: Aug. 14, 1980

[30] Foreign Application Priority Data

Aug. 14, 1979 [DK] Denmark ............................ 2932847

[51] Int. Cl.³ ........................................... F15B 13/042
[52] U.S. Cl. ......................................... 91/29; 60/384; 137/111
[58] Field of Search ................ 60/385, 386, 384; 91/6, 91/29; 137/114, 111

[56] References Cited

U.S. PATENT DOCUMENTS

| | | | |
|---|---|---|---|
| 3,543,783 | 12/1970 | Ifield | 137/111 X |
| 3,561,488 | 2/1971 | Byers | 137/625.62 |
| 3,566,749 | 3/1971 | Allen et al. | 60/384 X |
| 4,052,929 | 10/1977 | Baatrup et al. | 91/433 X |
| 4,266,464 | 5/1981 | Baatrup et al. | 60/384 |

Primary Examiner—George L. Walton
Attorney, Agent, or Firm—Wayne B. Easton

[57] ABSTRACT

The invention relates to a steering control unit for a bidirectional servomotor which is connectable to steerable wheels. A steering wheel controlled quantity setting unit of a known type has ports connectable to a pump and a return tank and two control ports through which metered quantities of fluid flow to opposite sides of the servomotor and to other parts of the apparatus for actuating the servomotor. A directional control valve for selectivity directing pressurized fluid from a power circuit to opposite sides of the servomotor is controlled by a control circuit containing the setting unit. A utility valve having the pressure regulating and control and power valve capabilities required for this type of apparatus is characterized by having only a single slide spool for performing all of these functions.

1 Claim, 3 Drawing Figures

HYDRAULIC CONTROL APPARATUS FOR A SERVO-MOTOR, PARTICULARLY FOR VEHICLE STEERING

The invention relates to a hydraulic control apparatus for a servo-motor, particularly for vehicle steering, comprising a control circuit having in series a direction-dependent quantity setting device with two control conduits and one control valve, and an operating circuit having in series a pressure regulator and an operating valve, wherein the pressure regulator sets the pressure between itself and the operating valve (resulting pressure) to the pressure between the quantity setting device and the control valve (control pressure) and wherein the inputs of the control and operating circuit are connected to a load-responsive valve on a pump and their outputs are connected to the common feed of the servo-motor.

In an earlier proposal for a control apparatus of this kind (DE-OS No. 27 38 463), use is made of a quantity setting device having a setting throttle fed by a pump and a downstream measuring motor. The throttle is opened by means of a first part actuated by a setting element and closed by means of a second part which is made to follow by the measuring motor. Depending on the pressure drop at the throttle, an upstream load-responsive (load-sensing) priority valve is so adjusted that the pressure fluid required for steering is tapped each time and the remainder is available for a further consumer. A control valve is disposed in each of the control conduits of the quantity setting device. Each control valve is associated with an operating valve in the operating circuit. A pressure balance feeding both branches of the operating circuit independently of direction serves as the pressure regulator. For the purpose of pressure control, the control valves and the operating valves, this requires a total of five slides which not only calls for a considerable number of movable components but also connecting conduits and control pressure conduits.

It is also known (U.S. Pat. No. 3,561,488) to combine the control valve and operating valve in a manner such that operating valve control ports and control valve control ports are provided on a common periphery and co-operate with an annular groove and always expose proportional flow sections. A pressure reducing valve between the pump and the operating valve gives rise to a constant pressure drop. By means of a setting valve between the pump and the control valve, throttle cross-sections can be set in response to an input signal. The common slide is on the one side subjected to the constant pressure behind the pressure reducing valve and on the other side to the control pressure. This does not permit control in proportion to the quantity, particularly because it is not possible to deliver a metered control quantity with the aid of the setting slide.

In hydraulic control apparatuses with amplification it is also known (DE-PS No. 12 71 553) to associate the servo-motor with a directional valve so that the elements necessary for the control valve, operating valve and pressure regulator need to be provided only once. In the known case, a control pump serves to set the quantity. Two separate slides which are actuated in unison form the control valve and the operating valve. The pressure regulator is formed by a comparative slide and a shunt valve. Here, again, a considerable number of slides and connecting conduits is necessary.

The invention is based on the problem of providing a hydraulic control apparatus of the aforementioned kind in which a control quantity can be set and proportionally amplified, it being possible to reduce the number of valves required for the pressure regulator, operating valve and control valve and also the number of connecting and control pressure conduits.

According to the invention, this problem is solved in that the pressure regulator, the operating valve and the control valve are combined as a slide constructional unit in which the one end face of the slide is subjected to the control pressure and the other to the resulting pressure, and a first annular groove disposed in the operating circuit co-operates with control pressure control ports and a second annular groove common to the operating and control circuits co-operates with operating valve control ports and control valve control ports lying on a common periphery, the operating valve control ports being connected to the pressure regulator control ports and altogether always exposing a flow section proportional to the control valve control ports.

In this construction, a single slide will be sufficient to undertake the functions of the control regulator, the operating valve and the control valve. The connection between the pressure regulator and operating valve can be within the slide. This combination is possible because, although there is a constant pressure distribution ratio between the pressure regulator and operating valve which are traversed by the same quantity of pressure fluid, the total pressure drop in the operating and control circuit is changed with the aid of the load-responsive valve, so that a defined position of equilibrium is obtained for the slide for each control pressure. Since on the other hand the flow sections in the operating valve and control valve are proportional to each other and the pressure drop is equal for each, one obtains the desired amplification.

In a preferred embodiment, the slide of the constructional unit has one operating valve distributor groove and one control valve distributor groove on each side of the operating valve control ports and the control valve control ports, both grooves being connected by way of oblique bores to radial passages leading to said control ports, and an axial bore is provided which extends up to the end and from which radial passages extend to the pressure regulator control ports and radial passages extend to the operating valve distributor groove. In this case, the axial bore provides a very simple connection between the pressure regulator and operating valve on the one hand and the end face of the slide subjected to the resulting pressure on the other hand.

It is desirable for the operating valve control ports altogether to expose a larger flow section than the pressure regulator control ports. In this way, relatively large operating valve control ports can be used for the purpose of obtaining large amplification without requiring excessively large pressure regulator control ports. If the control ports are of equal size, the desired effect is obtained for example in that an equal number of control ports is used for the pressure regulator and control valve and twice the number of control ports is used for the operating valve.

Advantageously, the servo-motor is associated with a directional valve of which the input on the pressure side is connected to the common output of the operating and control circuit, its downstream output is connected to the vessel, and its actuating pressure chambers are each connected to one control conduit, the operating valve and control valve being disposed in a respective part of the operating and control circuit which is traversed irrespective of direction. By using the directional valve, a single slide constructional unit will suffice for the entire control apparatus. In addition, no special measures need be taken for the return in pressure fluid. This leads to further simplification.

It is also advantageous if the control valve of the quantity setting device and the operating valve are downstream of the pressure regulator and the pressure conduit at the higher pressure can be connected to the control valve by a change-over switch. The change-over switch permits the quantity setting device to be upstream of the control valve so that comparatively low pressures will obtain in the quantity setting device.

Nor is it necessary to provide a special change-over switch because it can be formed by the directional valve. In this connection it is advisable for the control conduit at the lower pressure to be blocked by the directional valve. Should the directional valve jam in one limiting position and the quantity setting device is actuated in the opposite direction, this will lead to a pressure rise in the associated actuating pressure chamber of the directional valve so that the blocked slide will finally be released. In the meantime, no control quantity will be fed to the control valve, thereby avoiding any further adjustment of the servo-motor at full force in the wrong direction.

Several preferred examples of the invention will now be described in more detail with reference to the drawing, wherein.

Figure 1:
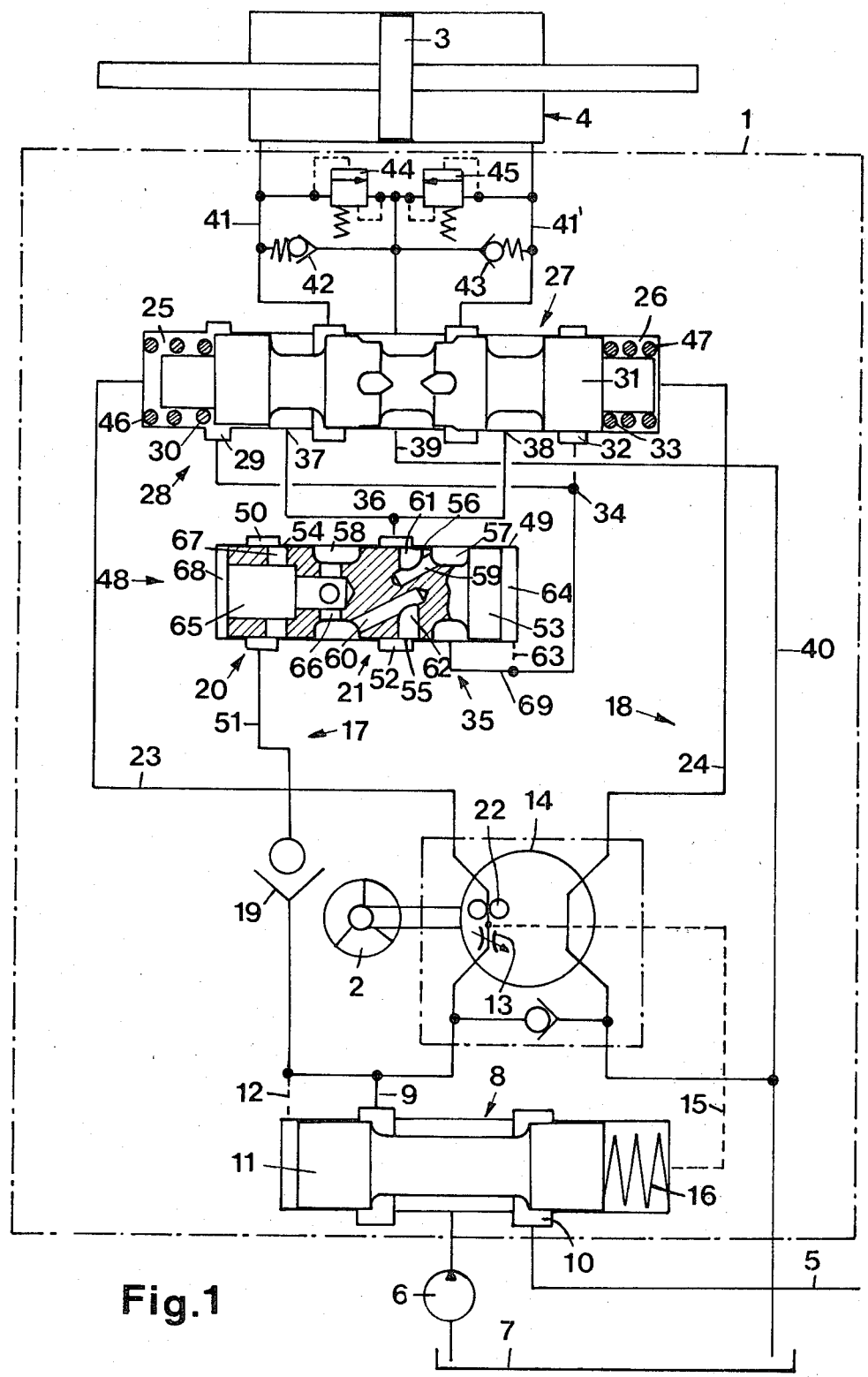
FIG. 1 is the circuit diagram of a first embodiment.

In FIG. 1, a hydraulic control apparatus 1 is provided for a vehicle steering. By adjusting a manual steering wheel 2, the piston 3 of a servo-motor 4 is actuated to adjust the wheels which are to be steered. In addition, a further consumer can be connected by way of a conduit 5. A pump 6 sucks pressure medium from a vessel 7 and feeds it to a load-pressure priority valve 8. The latter has an output 9 to feed the servo-motor 4 and an output 10 to feed the additional consumer. The slide 11 of the priority valve is impinged at one end through a control pressure conduit 12 by the pressure in front of the adjustable throttle 13 of a quantity setting device 14 and on the other side through a control pressure conduit 15 by the pressure behind this throttle 13 and a spring 16. Accordingly, pressure fluid is delivered through the output 9 depending on the requirements of the quantity setting device 14, whilst the remainder reaches the additional consumer through the output 10.

The control device comprises an operating circuit 17 and a control circuit 18. In the operating circuit, a check valve 19, a pressure regulator 20 and an operating valve 21 are provided in series. In the control circuit, there is provided the quantity setting device 14 with the adjustable throttle 13 and a measuring motor 22, by way of which one of two control conduits 23 or 24 is supplied with pressure fluid depending on the direction in which the steering wheel 2 is turned. This pressure fluid arrives by way of actuating pressure chambers 25 or 26 of a directional valve 27 and a change-over switch 28 which consists respectively of an annular groove 29 with control edge 30 at the slide 31 of the directional valve or of an annular groove 32 and control edge 33. Accordingly, the junction 34 of the control circuit is in each case connected to the control conduit 23 or 24 at the higher pressure. This is followed by a control valve 35. The control circuit and operating circuit have a common outlet 36 which is connected to both inputs 37 and 38 of the directional valve which also has an output 39 leading to the vessel 7 by way of a conduit 40. The directional valve is connected to two motor conduits 41 and 41' so that the servo-motor will always receive pressure fluid by way of the motor conduit whereas the other motor conduit is connected to the vessel 7. Two replenishing valves 42 and 43 connect the motor conduits 41 or 41' to the return conduit 40 and two shock valves 44 and 45 permit a reduction of excessive pressures in the servo-motor when the latter is subjected to shocks from the outside. Further, one neutral position spring 46 or 47 is provided in each actuating chamber 25 and 26.

The pressure regulator 20, operating valve 21 and control valve 35 are combined as one slide constructional unit 48. The latter has a bore 49 with a first annular groove 50 which is connected to one operating conduit 51 and a second annular groove 52 which is connected to the output 36. A slide 53 has pressure regulator control ports 54 which co-operate with the first annular groove 50 and, on the same periphery, operating valve ports 55 and control valve ports 56 which co-operate with the second annular groove 52. At both sides of the last-mentioned control ports, there is a control valve distributor groove 57 and an operating valve distributor groove 58. Both communicate with the control ports 56 and 55 by way of oblique bores 59 and 60 and radical passages 61 and 62, respectively. The control valve distributor groove 57 communicates with the common junction 34 by way of a conduit 69. A control pressure conduit 63 leads to the actuating pressure chamber 64 at the one end of the slide 53. An axial bore 65 communicates with the operating valve annular groove 58 by way of radial passages 66 and with the pressure regulator control ports 54 by way of radial passages 67. At the same time, a connection to the actuating pressure chamber 68 is produced at the other end of the slide 53.

In operation, if the steering wheel 2 is turned so that there is pressure in the control conduit 23, the slide 31 of the directional valve 27 is pushed into the right-hand limiting position of FIG. 1. At the same time, the control pressure in the actuating pressure chamber 64 acts on the slide 53. The latter is pushed to the left, whereby all the control ports 54, 55 and 56 open. In addition, the pressure drop at the throttle 13 of the quantity setting device which blocks all flow in the neutral position results in a defined position for the priority valve 8 which gives a certain pressure drop in the operating and control circuit. The slide 53 assumes a position of equilibrium at which the resulting pressure in the actuating pressure chamber 68, i.e. the pressure between the pressure regulator 20 and the operating valve 21, is equal to the control pressure. By way of the common output 36 and the directional valve 27, the left-hand side of the servo-motor 4 is now supplied with pressure fluid which is composed of the control quantity determined by the quantity setting device 14 and a proportional amount which is fed by way of the operating circuit 17. The quantity ratio depends on the cross-sectional dimensions of the operating valve control ports 55 and the control valve ports 56. The distribution ratio between the pressure drop at the pressure regulator 20 and the pressure drop at the operating valve 21 can be selected by appropriately dimensioning the pressure regulator control ports 54 and the operating valve control ports 55.

Figure 2:
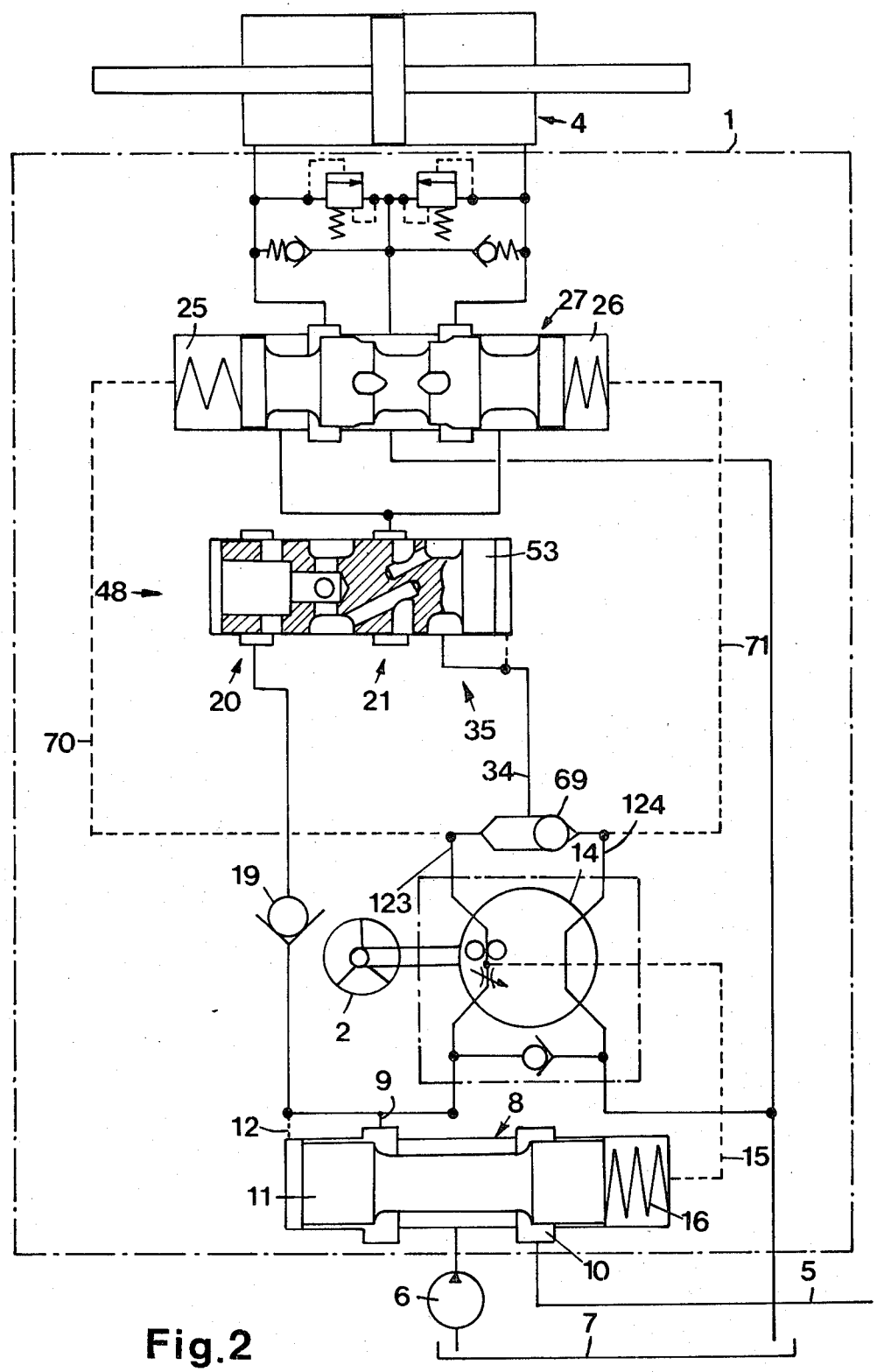
FIG. 2 is the circuit diagram of a second embodiment.

The FIG. 2 embodiment corresponds to that of FIG. 1 to a large extent. The same reference numerals are therefore employed for identical parts. The only difference is that switching over of the control conduits 123 and 124 is effected by means of a separate changeover valve 69 and control pressure conduits 70 and 71 lead to the actuating pressure chambers 25 and 26 of the directional valve 27.

Figure 3:
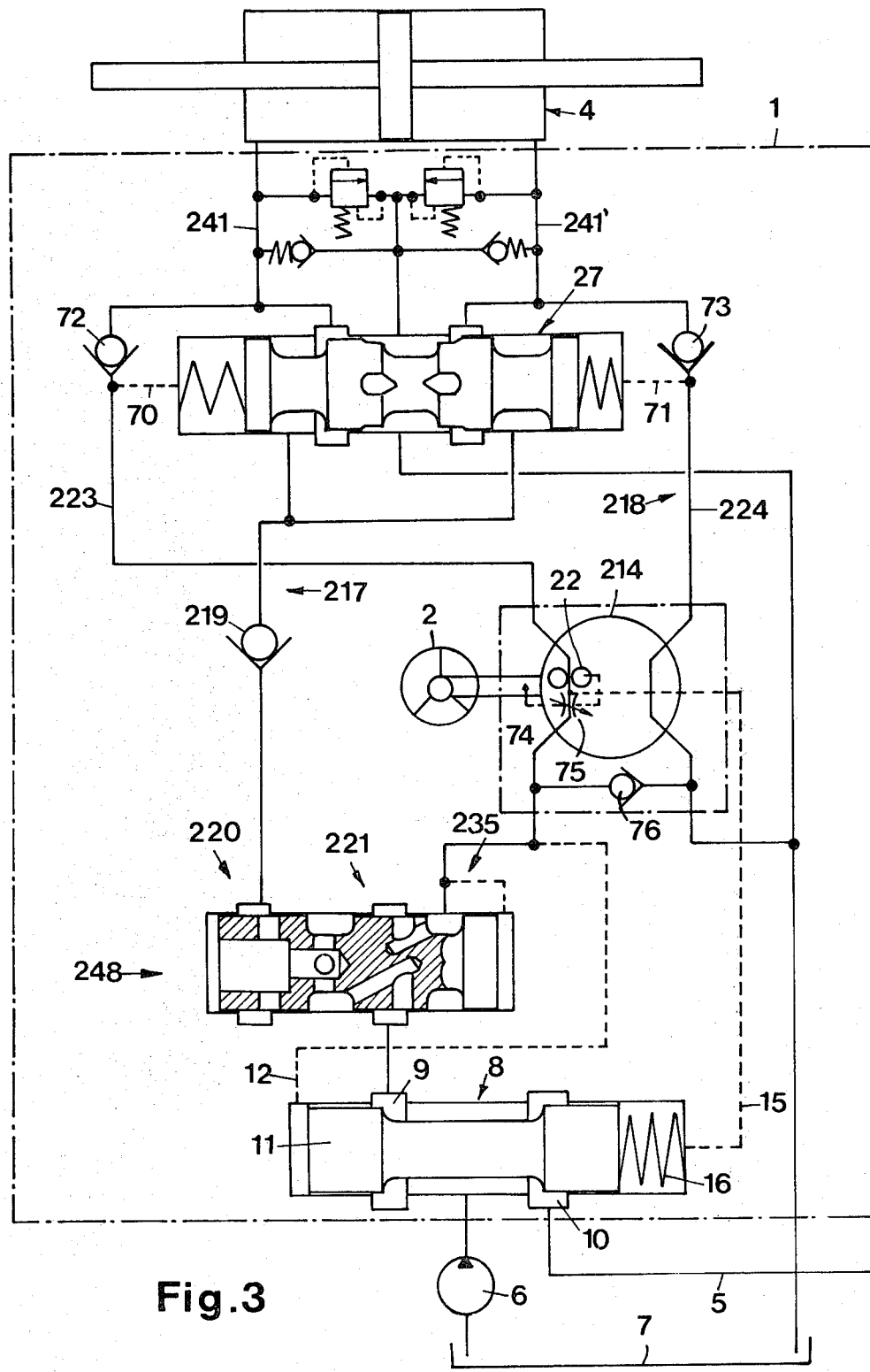
FIG. 3 is the circuit diagram of a third embodiment.

In the FIG. 3 embodiment, the same reference numerals as in FIGS. 1 and 2 are again employed for the same parts. The difference here is that the two control conduits 223 and 224 open directly into the operating conduits 240 and 241 by way of a respective check valve 72 and 73 and that the slide constructional unit 248 is disposed upstream of the quantity setting device 214 in the control circuit 218 and upstream of the check valve 219 in the control circuit 217. Consequently the operating valve 221 is also disposed in front of the pressure regulator 220. Further, the control valve 235 is disposed upstream of the quantity setting device 214. The manner of operation is similar to FIGS. 1 and 2. Only the pressure in the quantity setting device 214 is at a higher level.

This Figure also shows that the one part 74 of the throttle is adjusted by the manual actuating element 2 and that the other part 75 of the throttle is made to follow by the measuring motor 22. In addition, the quantity setting device is bridged by a check valve 76 which permits any additional suction or flow on the pressure side.

In all the embodiments, a slide 53 has been used in which the control ports 54, 55 and 56 are in the form of openings in radial bores. They all have the same cross-section. In each case there are two pressure regulator control ports 54, four operating valve control ports 55 and two control valve control ports 56. This results in the pressure drop at the pressure regulator control ports to be twice that at the operating and control valve control ports and in the amount of pressure medium flowing through the operating circuit to be four times that of the control quantity. The numerical ratios could also be different. Instead of round control ports it is possible to employ depressions of any desired different cross-sectional shape at the periphery of the slide 53.

What is claimed is:

1. A hydraulic steering control assembly, comprising, a bidirectional servomotor having two operating ports on opposite sides thereof, a pump and a tank, operable steering control means, a metering control controlled by said steering control means having input and output ports and left and right control ports to which pressurized fluid may be selectively directed from said input port and returned from the other said control ports to said output port, bidirectional valve means having inlet port means and directional power control ports connected to said servomotor ports for selectively supplying and exhausting pressurized fluid therefrom, said bidirectional valve means having left turn inlet and outlet control ports and right turn inlet and outlet control ports a two sided control circuit connected to said metering unit control ports and to said bidirectional valve means right and left turn inlet control ports, utility valve means having pressure regulating and control and power valve capabilities, said utility valve means having a single slidable spool disposed in a valve housing having first and second input passage means and output passage means, said spool and said housing forming first and second chambers at opposite ends thereof, a power circuit connected to said pump and to said utility valve means first input passage means, said spool having a first internal passage means having fluid communication with said first chamber and being in an adjustable throttling relationship with said first housing input passage means to regulate the pressure of fluid at said first housing input passage means, said bidirectional valve means left and right turn outlet control ports being selectively connected via said metering control unit to said second utility valve means chamber and to said valve housing second input passage means, said spool having second internal passage means in constant fluid communication with said first internal passage means thereof and said housing second input passage means and said valve housing output passage means to combine pressure fluids from said control and power circuits, said valve output passage means being connected to said bidirectional valve means inlet port means to provide a common path for pressurized fluids from said power and control circuits.

* * * * *